United States Patent
Kassianoff

(10) Patent No.: US 9,157,417 B2
(45) Date of Patent: Oct. 13, 2015

(54) VARIABLE FOIL MACHINE

(71) Applicant: Edouard P. Kassianoff, Calgary (CA)

(72) Inventor: Edouard P. Kassianoff, Calgary (CA)

(*) Notice: Subject to any disclaimer, the term of this patent is extended or adjusted under 35 U.S.C. 154(b) by 346 days.

(21) Appl. No.: 13/573,824

(22) Filed: Oct. 9, 2012

(65) Prior Publication Data

US 2014/0097621 A1    Apr. 10, 2014

(30) Foreign Application Priority Data

Oct. 11, 2011    (CA) ..................................... 2755167

(51) Int. Cl.
*F03D 9/00*    (2006.01)
*F03D 5/06*    (2006.01)
*F01D 23/00*    (2006.01)

(52) U.S. Cl.
CPC ................ *F03D 9/002* (2013.01); *F01D 23/00* (2013.01); *F03D 5/06* (2013.01); *Y02E 10/70* (2013.01)

(58) Field of Classification Search
CPC ... Y02E 10/74; Y02E 10/721; F05B 2260/72; F05B 2240/211
USPC ...... 416/9–12, 79, 81–83, 131, 132 R, 132 A, 416/132 B; 290/54, 55
See application file for complete search history.

(56) References Cited

U.S. PATENT DOCUMENTS

| | | | | |
|---|---|---|---|---|
| 3,995,972 | A * | 12/1976 | Nassar | 416/68 |
| 4,486,145 | A * | 12/1984 | Eldredge et al. | 416/82 |
| 4,527,950 | A * | 7/1985 | Biscomb | 416/117 |
| 5,009,569 | A * | 4/1991 | Hector et al. | 415/4.1 |
| 6,877,692 | B2 * | 4/2005 | Liu | 244/22 |
| 7,573,143 | B2 | 8/2009 | Frayne | |
| 7,626,281 | B2 * | 12/2009 | Kawai | 290/54 |
| 8,272,839 | B2 * | 9/2012 | Gartner | 416/81 |
| 8,278,776 | B1 * | 10/2012 | Arntz | 290/54 |
| 8,860,240 | B2 * | 10/2014 | Lovas | 290/55 |
| 2009/0108586 | A1 * | 4/2009 | Koury | 290/55 |
| 2010/0276937 | A1 * | 11/2010 | Clynes | 290/55 |
| 2011/0163551 | A1 * | 7/2011 | King et al. | 290/55 |
| 2012/0068465 | A1 * | 3/2012 | Dawoud et al. | 290/55 |

OTHER PUBLICATIONS

U.S. Appl. No. 12/266,553, Platzer et al.
U.S. Appl. No. 60/736,489, Morris.
U.S. Appl. No. 11/984,850, Gartner.

* cited by examiner

*Primary Examiner* — Joshua Kennedy

(57) ABSTRACT

The Variable Foil Machine harnesses fluid flow energy and propels fluids. A flexible foil (120) with reversible camber is secured to leading draft member (150) on leading support (122) and to trailing draft member (130). The trailing draft member (130) is secured to trailing guide (132), movable on trailing support (136). Apparatus can be installed on the ground or a craft via pivoting carrier (138), for alignment with fluid flow. In one embodiment, trailing draft member (130) reciprocates between support members 136*l* and 136*r*, upon oscillation of the foil (120). In other embodiments, a reciprocation amplitude offset between leading draft member (150) and trailing draft member (130) promotes cyclic translation of the foil (120) and linkage thereto. An energy converter (142) may be cooperatively coupled to produce energy or perform work. Integration of foil oscillations into rotary movement via a crank arm (48) is also embodied.

15 Claims, 12 Drawing Sheets

VARIABLE FOIL MACHINE

1. TECHNICAL FIELD

The Variable Foil Machine relates to wings and sails and, more particularly, to oscillating wing devices that interconvert fluid flow and work or energy.

2. BACKGROUND ART

An oscillating wing is disclosed in U.S. patent application Ser. No. 12/266,553 to Platzer et al (2008): an unstable pivoting wing with a spike is mounted on an axle with pitch control rods; this assembly is attached to a base plate with arms and switching rods. To produce oscillations this design relies on a pitch reversal spike, two pitch control rods, two arms and two switching rods. Although sails are mentioned in the above application, a pertinent sail wing design is not disclosed. A wind fin assembly, made of segmented and articulated airfoils, is disclosed in Patent Application CA2599435 to Morris (2007) and in U.S. patent application Ser. No. 11/895,568 to Morris (2007): the wind fin assembly pivots a supporting mast upon oscillation. An inflatable airfoil is mentioned in the above design; however, oscillation of the device is anticipated on the basis of a segmented and articulated assembly of airfoils, a trim bias element and a facilitating weight on a component airfoil. A flexible sheet pivotably tensioned between aligned support members is disclosed in U.S. patent application Ser. No. 11/984,850 to Gartner (2007). This design relies on the tensioned sheet imparting a limited torsional movement to the support members. Elaborate sheet tensioning spindle, telescoping adjustment and inter support member distance adjustment devices are embodied in this design. Tensioning of the sheet between aligned support members minimizes potential oscillation amplitude and effective energy capture cross section area. A vibrating membrane fixed at two ends is described in U.S. Pat. No. 7,573,143 to Frayne (2009). This design relies on the natural tendency for thin sheets of materials to flutter in the wind or aeroelastic flutter. Flutter devices are limited to small scale energy harvesting machines or sensors, largely due to the limitations of the small amplitude working membrane, low load capacity of the membrane and the requirement for securing the membrane's ends in fixed positions.

Thus, current designs in oscillating foil machines are either small scale systems with limited oscillation amplitude and power output or require additional tensioning, trimming and actuating devices or articulated foil combinations to initiate and sustain oscillations. Therefore, it is an object and advantage of the Variable Foil Machine to address the limitations in the prior art, as outlined above. Other objects and advantages of my invention will become apparent from the detailed description that follows and upon reference to the drawings.

3. BRIEF DESCRIPTION OF THE DRAWINGS

A complete understanding of the present invention may be obtained by reference to the accompanying drawings, when considered in conjunction with the subsequent, detailed description, in which.

4. DISCLOSURE OF INVENTION

Figure 1:
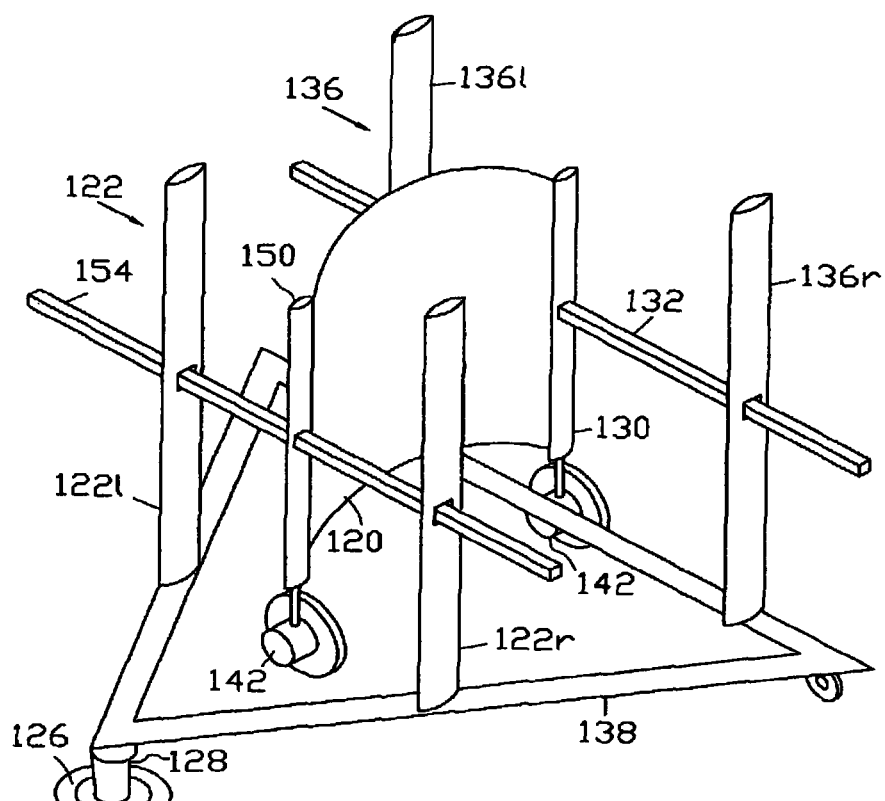
FIG. 1 is a perspective view of the concept embodied in the variable foil machine for power generation and fluid propulsion.
Figure 6:
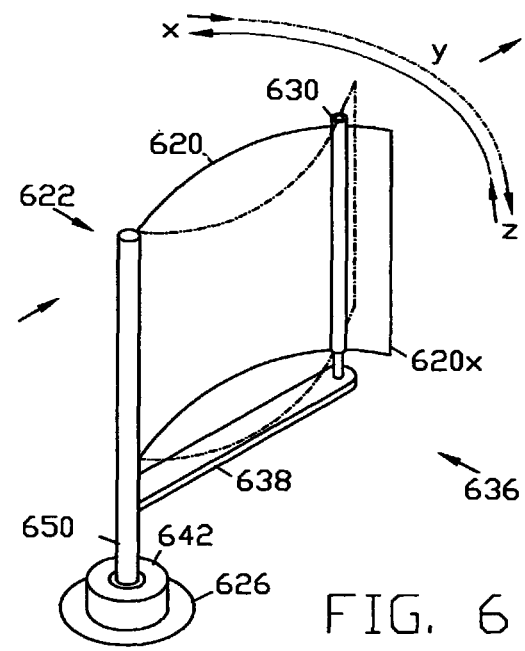
FIG. 6 is a perspective view of an oscillating foil with trailing draft member integral with the pivoting carrier.

FIG. 1 depicts a machine with a reversible camber wing at the heart of the present invention. The Variable Foil Machine is useful in power generation and fluid propulsion. A foil, sail, wing, airfoil or hydrofoil has a leading edge, leading into the flow of a fluid, and a trailing edge, downstream of the leading edge. A foil of dynamic profile, a variable foil 120, for energy capture, is made out of flexible material cut to a length measured between its leading and trailing edges; the flexible material may be of uniform properties or be made of graded material properties along the foil's length to achieve desired dynamic characteristics under contemplated climate and fluid flow conditions. Among the properties to consider are turgidity, useful temperature range, thickness, stiffness, density, flexibility, durability, resilience, noise, and fatigue characteristics. Examples of current materials that can be used to make the variable foil 120 include fabrics, composites, polymers, sheet metal and combinations thereof. Examples of polymer material that can be used include Nylon, Neoprene and polyurethane foam. Other materials with characteristics suitable for the intended application can also be used. The sheet of material may be cut rectangular, square, or other sail geometry and may advantageously be shaped and finished for maximum fluid-dynamic efficiency. The length of the foil influences its profile dynamics and operational characteristics: a thicker or stiffer foil will bend less readily than a thinner or more flexible one. For a fixed chord length the longer the sail is the greater the camber will be under fluid pressure. Camber affects lift and drag efficiency. Sail shapes and their fluid dynamic properties are known to those skilled in the art. Methods for sail manufacture are also known to those skilled in the art and can be adapted to produce the variable foil 120. The variable foil 120 may be ribbed, inflated with gas or cored with gas or polymer foam for control of turgidity and dynamic shape. Ribs may be inflatable tubes or they may be made out of tubing, strips or sheets of flexible metal, composite, wood or polymers attached to the foil; other materials can also be used. For an effective harnessing of the energy of fluid flow by the Variable Foil Machine, a flexible and turgid foil is advantageous; this is because a floppy foil can enter into flapping mode without notice, negating the fluid-dynamic advantages of profile and angle of attack. However, for fluid propulsion applications the turgidity requirement is less stringent as the foil can be forced turgid by the fluid being propelled. Once cut to design length, the variable foil 120 may be fastened directly, or via connectors, at its leading edge to a leading draft member 150 and at its trailing edge to a trailing draft member 130. The variable foil 120 may be extended past the trailing draft member 130 or be fitted with a foil extension or tail 20x past the trailing draft member 30 as illustrated further below (FIG. 6). Trailing draft member 130 is secured to a trailing guide 132 movable through aft left support member 136*l* and aft right support member 136*r* of a trailing support 136, for grounding directly or via a pivoting carrier 138, to the Earth for example, or for grounding to the reference ground or generally to a base as provided by a craft, for example. Throughout this specification, the term "base" stands for the planet ground such as the Earth ground or other reference ground as exemplified by a watercraft and the term "grounding" also means "securing to the base". The trailing support 136 include elements necessary to ground the trailing edge of the variable foil 120 as herein described. The leading draft member 150 is rigidly or slideably secured to a leading guide 154. The leading guide 154 is in turn moveably supported by fore left support member 122*l* and fore right support member 122*r* of a leading support 122, for grounding directly to the reference ground or for grounding via the pivoting carrier 138. The leading support 122 include elements necessary to support the leading edge of the variable foil 120 as herein described. The pivoting carrier 138 may be secured to the ground via a pivot member 128 in turn secured to the ground by an anchor 126. An energy converter 142 may be cooperatively connected to the leading draft member 150, the trailing draft member 130 and mechanical linkage thereto.

Components of the Variable Foil Machine may be made out of metal, wood, composites, polymers or any other material suitable for the intended application; it is recommended to use materials of high strength, durability, and fatigue characteristics suitable for the intended application. In choosing materials, consideration should be given to the environment weather, moisture, corrosion, light degradation, historical and average fluid flow parameters such as speed, flow rate and suspended matter content. The above factors can affect the reliability and useful life of an installation. Fastening materials and methods should be reliable and durable and include for example glues, epoxies, sewing, roping, riveting, welding, molding, extrusion, lamination, mating, zipping, bolts, nuts, sandwich and the likes. Any other way of secure fastening that is reliable and durable for the application circumstances can also be used. The leading support 122 and trailing support 136 may be secured directly to the ground or reference ground, for example to the body of a craft; they may also be secured to the ground using concrete, steel or a combination thereof, for example. The leading support 122 and trailing support 136 may also be secured to each other as a unit, and to the ground or reference ground, for example to the body of a craft. A steering mechanism may also be secured to the pivoting carrier 138; alternatively, the variable foil 120 can substitute as built-in steering. Alignment of machine with fluid flow optimizes energy harvest.

Power take off can be obtained by coupling generators or other useful devices to the moving components. When placed in an effective fluid flow, the Variable Foil Machine can swing from side to side about the pivot member 128 as the variable foil 120 oscillations animate guides 132, 154, draft members 130, 150, and pivoting carrier 138.

5. MODES FOR CARRYING OUT THE INVENTION

For purposes of clarity and brevity, features whose function is the same or basically the same will be identified in each figure or alternative embodiment by a prefix of the figure number the variant feature appears in, followed by the feature number, the feature number being the same for all variants. Examples of embodiments making use of an oscillating foil will be described first, followed by a description of examples of embodiments making use of a translating foil.
Embodiment of Oscillating Foil with Reciprocating Trailing Draft Member—FIG. 2

A variable foil 220, having a leading edge and a trailing edge, is secured at its leading edge to leading draft member 250 of leading support 222, for grounding. The leading draft member 250 is directly secured to the ground or other reference ground or secured to the ground through an anchor 226; a pivot member 228, for facilitating rotation, may also be coupled to the leading draft member 250. The trailing edge of the variable foil 220 is secured to a trailing draft member 230, having a displacement amplitude or oscillation amplitude. The trailing draft member 230 is securely attached to the trailing guide 232. The trailing guide 232 is free to move through aperture 234 located in aft left support member 236*l* and aft right support member 236*r* of trailing support 236, for grounding. The trailing guide 232 may be advantageously indexed to aperture 234 by fluting, splines, keys, a square fit or any other mating shape that controls rotation of the trailing guide 232 about the aperture 234. An energy converter 242, for work or power generation, may be cooperatively coupled to the trailing draft member 230. Additional guides may also be provided for sound load support and guidance, depending on scale of installation. The pivoting carrier 238 is secured to the pivot member 228 and could be supported entirely by the pivot member 228; however, a rolling mechanism, a wheel 240 for example, for facilitating movement, can be fitted to the pivoting carrier 238 for additional ground or reference ground support. The energy converter 242 (e.g. electricity generator, pump, propeller), may be securely coupled to the trailing draft member 230 to substitute for the trailing support 236 while at the same time producing energy or performing work or function. In such a substitution, the moving parts of the energy converter 242 may be advantageously indexed by fluting, splines, a square fit, or any other mating shape or device that controls rotation. The energy converter 242 may be provided in the form of a linear generator or other devices and machines as exemplified in further embodiments below.
Operation-Embodiment of Oscillating Foil with Reciprocating Trailing Draft Member—FIG. 2-2A

Figure 2:
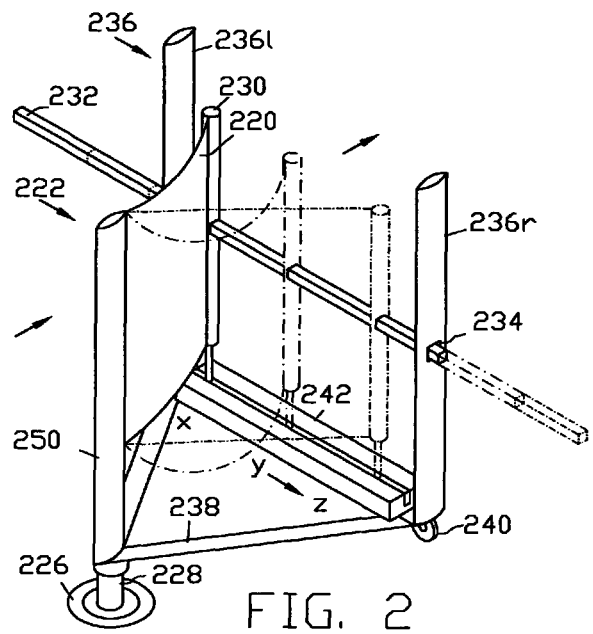
FIG. 2 is a perspective view of an oscillating foil with reciprocating trailing draft member in a rightward stroke.
Figure 2A:
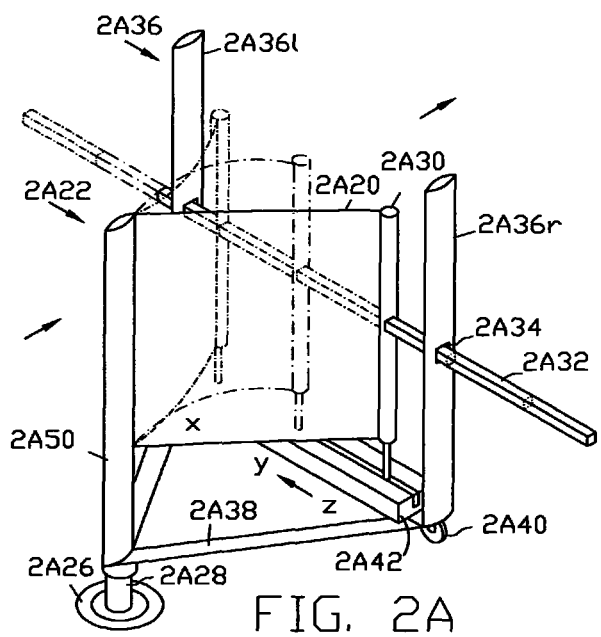
FIG. 2A is a perspective view of an oscillating foil with reciprocating trailing draft member in a leftward stroke.

FIG. 2 depicts the Variable Foil Machine at the start of a rightward stroke, with the variable foil 220 at extreme left position x in relation to the direction of fluid flow, indicated by top arrows; camber of the variable foil 220 is at its minimum. Fluid flow exerts a force on the variable foil 220, causing it to bow to the right and displacing with it the trailing draft member 230 and the trailing guide 232 towards the middle of the energy converter 242, at maximum camber position y, as shown in discontinuous lines. The bowing of the variable foil 220 creates a fluid-dynamic foil, which enhances conversion of the energy of fluid flow into mechanical movement of the trailing draft member 230. Under continued flow conditions, the trailing draft member 230 reaches the end of the stroke to the right at position z as shown in discontinuous lines; camber of the variable foil 220 returns to its minimum. In FIG. 2A, continued fluid flow causes the Variable Foil Machine to repeat the above process in reverse direction for a leftward stroke from position z to position y, bowing the variable foil 2A20 to the left before returning to the starting configuration at position x. Illustrative configurations of the variable foil 2A20 at positions y and x are shown in discontinuous lines. Oscillations of the trailing draft member 2A30, together with the trailing guide 2A32, continue as long as there is effective fluid flow. Movement of the trailing draft member 2A30 drives the energy converter 2A42 or any other useful device or machine to produce energy (e.g. electricity) or perform work or function. An alternative power take off is provided by the trailing guide 2A32 shuttling through aperture 2A34 of support members 2A36l, 2A36r. Reciprocating movement to rotary movement adapter mechanisms may be utilized to drive rotary machines using the present embodiment. The pivoting carrier 2A38 aligns the machine with the direction of fluid flow to maximize energy harvesting.

Figure 2B:
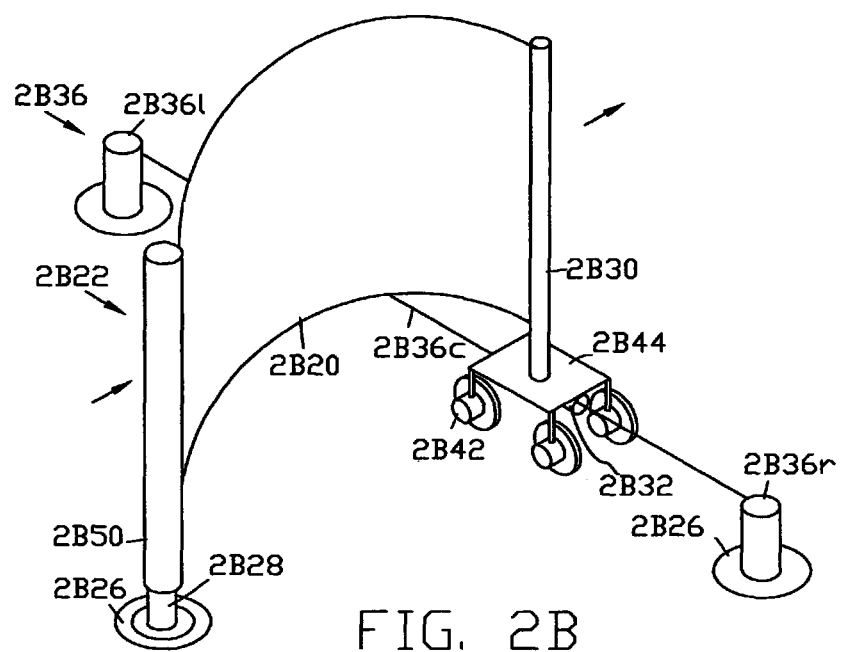
FIG. 2B is a perspective view of a large scale oscillating foil with reciprocating trailing draft member.

Embodiment of Large Scale Oscillating Foil with Reciprocating Trailing Draft Member—FIG. 2B

The variable foil 2B20 is secured at the leading support 2B22 to leading draft member 2B50; leading draft member 2B50 may be secured directly into the ground or secured to the ground via the anchor 2B26. The pivot member 2B28 may also be coupled to the leading draft member 2B50. The trailing draft member 2B30 is secured to a carriage 2B44, for conveyance of the energy converter 2B42. The carriage 2B44 is fitted with the trailing guide 2B32 moveably coupled to aft center support member 2B36c. The all center support member 2B36c may be made out of for examples cable, rope, wire, rail, rod, tubing, extrusions, slot or like structures secured by aft left support member 2B36l and aft right support member 2B36r of trailing support 2B36. Whereas a pair of support members, in a vertical orientation, may be sufficient to support a cable as exemplified in FIG. 2B, a rail line may require a plurality of support members in a horizontal or vertical orientation. A rail car on a rail track or a translating crane may also serve the function of the carriage 2B44. Support members 2B36r, 2B36l of the trailing support 2B36 may be secured directly to the ground or secured to the ground via the anchor 2B26. Support members 2B36l, 2B36r may also be secured to or integrated into environmental features such as embankments, cliffs, valley slopes, and trees. The present embodiment provides the added advantage of flexibility in scale.

Operation-Embodiment of Large Scale Oscillating Foil with Reciprocating Trailing Draft Member—FIG. 2B

This embodiment operates in a manner similar to that previously described for FIG. 2-2A above with the added advantage of upscaling potential for individual installations. As fluid flows from the leading support 2B22 to the trailing support 2B36, along indication arrows, the carriage 2B44 shuttles along the aft center support member 2B36c, powered by the movement of the trailing draft member 2B30. Movement of the carriage 2B44 drives the energy converter 2B42 against the reference ground or terrain to produce energy (e.g. electricity). Any other useful device or machine may be driven in a similar manner to produce energy or perform work or function. Linear energy converters, reciprocating devices and machines may be actuated by the present embodiment. Reciprocating movement to rotary movement adapter mechanisms may be utilized to drive rotary machines using the present embodiment.

Figure 3:
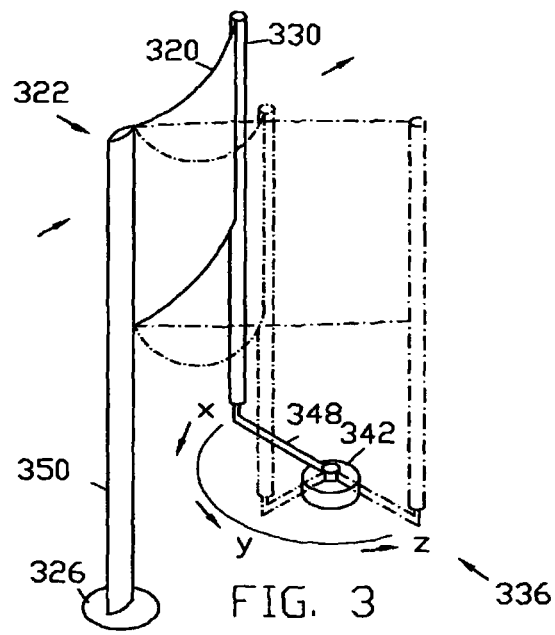
FIG. 3 is a perspective view of a variable foil with crank arm, in an anticlockwise swing of a rotary energy converter.

Embodiment of Oscillating Foil with Reciprocating Crank Arm—FIG. 3

The variable foil 320 is secured at the leading edge to the leading draft member 350 of the leading support 322, and at the trailing edge to the trailing draft member 330 of the trailing support 336. Leading draft member 350 may be secured directly into the ground or secured to the ground via the anchor 326. The energy converter 342 is securely coupled to the trailing draft member 330 through a crank arm 348. The trailing draft member 330 may advantageously be pivotably secured to the crank arm 348, although a fixed connection also works. The length of the variable foil 320 is greater than the minimum distance from the leading draft member 350 to the crank arm 348 but less than the minimum distance from the leading draft member 350 to the center of the crank arm 348. The length of the variable foil 320 contains displacement of the trailing draft member 330 to an arc. In this embodiment the energy converter 342 also serves the functions of the trailing support 336 and the trailing guide 332. This embodiment provides the advantages of simplified construction and reduced weight and size by reducing the number of components.

Figure 3A:
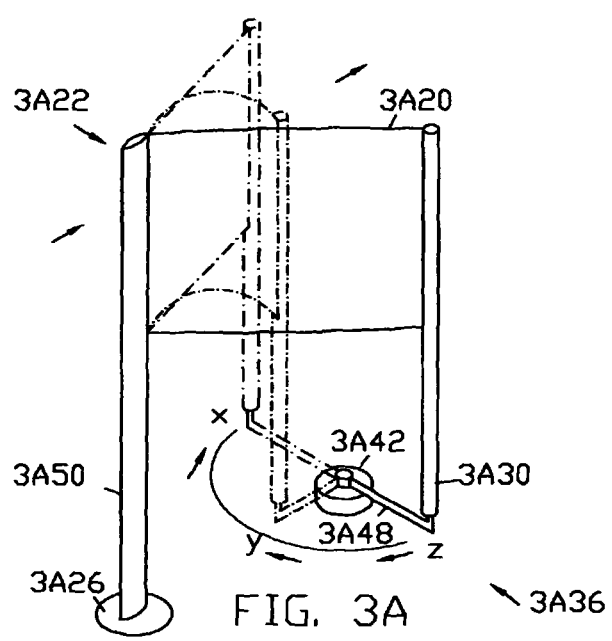
FIG. 3A is a perspective view of a variable foil with crank arm, in a clockwise swing of a rotary energy converter.

Operation-Embodiment of Oscillating Foil with Reciprocating Crank Arm—FIG. 3-3A

FIG. 3 shows the trailing draft member 330 at position x, at the start of an anticlockwise swing towards position y, along arc xyz, powered by fluid flow along the direction shown by top arrows. The variable foil 320 is cambered to the right by the force of fluid flow; the variable foil 320 swings about the rotary energy converter 342, moving the trailing draft member 330 and the crank arm 348 towards position y and ending the swing at position z. Configurations of the variable foil 320 at positions y and z are illustrated in discontinuous lines. FIG. 3A depicts the machine at position z, at the end of the anticlockwise swing and the start of the reverse, clockwise swing towards position y, along arc zyx. The variable foil 3A20 is cambered to the left by the force of fluid flow; the variable foil 3A20 swings about the rotary energy converter 3A42, moving the trailing draft member 3A30 and the crank arm 3A48 towards position y and ending the swing at position x, for a repeat cycle. Illustrative configurations of the variable foil 3A20 at positions y and x are shown in discontinuous lines. The camber of the variable foil 3A20 creates a fluid-dynamic foil, which enhances conversion of the energy of fluid flow into mechanical movement of the trailing draft member 3A30. The length of the variable foil 3A20 contains shuttling of the trailing draft member 3A30 to arcs xyz, zyx. Shuttling or oscillations in the manner described above continue as long as there is effective fluid flow; oscillations of the trailing draft member 3A30 drive the energy converter 3A42 in oscillation mode, to perform work or generate energy in the form of electricity, for example. Any other useful device or machine may be driven in a similar manner to produce energy, perform work or function. Reciprocating movement to rotary movement adapter mechanisms may be utilized to drive rotary machines using the present embodiment of the Variable Foil Machine.

Figure 4:
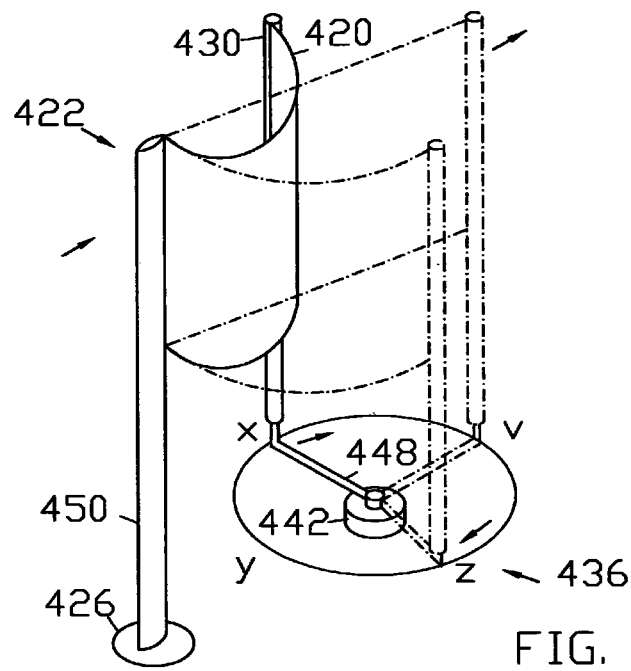
FIG. 4 is a perspective view of an oscillating variable foil with crank arm, in a rightward swing of an energy converter's rotation.

Embodiment of Oscillating Foil with Rotating Crank Arm—FIG. 4

The variable foil 420 is secured at the leading edge on leading draft member 450 of the leading support 422, and at the trailing edge to the trailing draft member 430. Leading draft member 450 may be secured directly into the ground or secured to the ground via the anchor 426. The energy converter 442 is securely coupled to trailing draft member 430 through crank arm 448. The trailing draft member 430 may advantageously be pivotably secured to the crank arm 448, although a fixed connection also works. The length of the variable foil 420 is equal to or greater than the sum of the length of the crank arm 448 and the distance from the leading draft member 450 to the center of the energy converter 442: the length of the variable foil 420 enables rotation of the trailing draft member 430 about the energy converter 442. If required, direction of rotation may be fixed by way of ratcheting mechanisms, brake bias (not shown) or any other suitable mechanism. This embodiment provides the advantages of simplified construction and reduced weight and size by reducing the number of components. Another advantage of this embodiment is the direct conversion of oscillations into rotational movement.

Figure 4A:
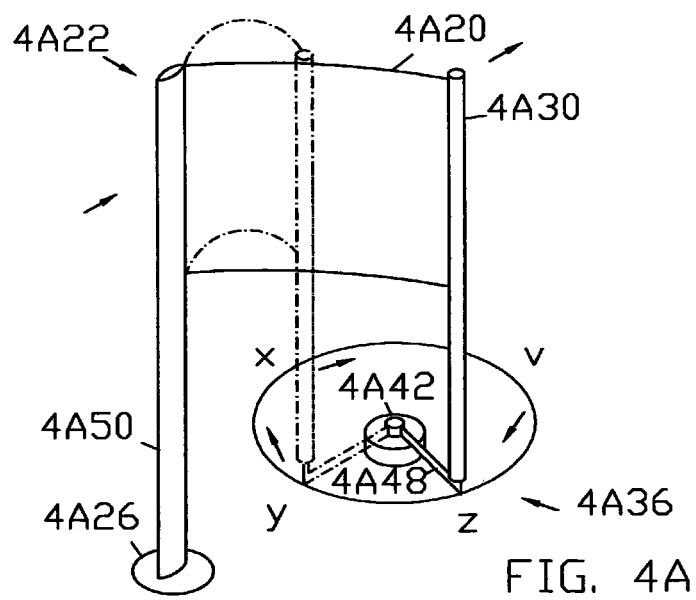
FIG. 4A is a perspective view of an oscillating variable foil with crank arm, in a leftward swing of an energy converter's rotation.

Operation-Embodiment of Oscillating Foil with Rotating Crank Arm—FIG. 4-4A

FIG. 4 depicts the Variable Foil Machine at the start of a revolution, with the trailing draft member 430 at position x of circular path xvzy. Fluid flow as indicated by top arrows bows the variable foil 420 to the right, creating a fluid-dynamic foil which enhances conversion of the energy of fluid flow into mechanical movement of the trailing draft member 430. The variable foil 420 swings clockwise about the energy converter 442, moving the trailing draft member 430 and the crank arm 448 towards position z through position v. In FIG. 4A, from position z continued fluid flow cambers the variable foil 4A20 to the left, moving the trailing draft member 4A30 and the crank arm 4A48 through position y and back to position x. Illustrative configurations of the variable foil 4A20 at position y and variable foil 420 at positions v, z are shown in discontinuous lines. The length of the variable foil 4A20 enables integration of oscillations into a full rotation movement of the energy converter 4A42. Movement of the trailing draft member 4A30 drives the energy converter 4A42, in rotary mode, to perform work or produce energy, for example electricity. Any other useful device or machine may be driven in a similar manner to produce energy, perform work or function. Rotary movement to reciprocating movement adapter mechanisms may be utilized to drive reciprocating machines using the present embodiment of the Variable Foil Machine.

Figure 5:
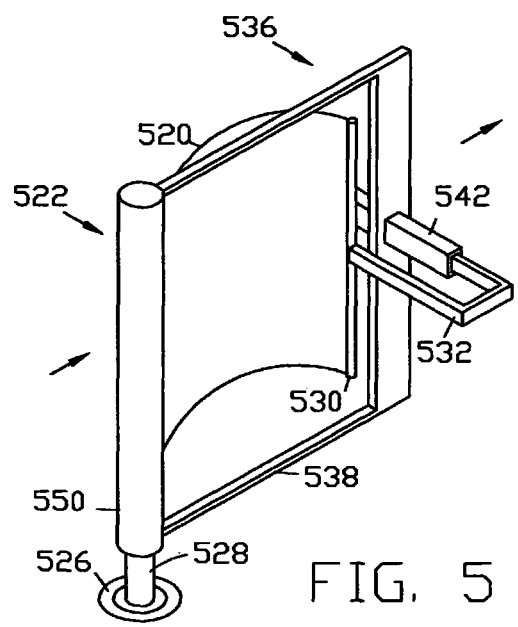
FIG. 5 is a perspective view of an oscillating foil with reciprocating trailing draft member on a vertical pivoting carrier.

Embodiment of Oscillating Foil with Reciprocating Trailing Draft Member on Vertical Pivoting Carrier—FIG. 5

The variable foil 520 is secured at the leading support 522 to leading draft member 550; leading draft member 550 is secured to the ground through pivot member 528 on the anchor 526. The trailing draft member 530 is secured to the trailing edge of the variable foil 520 and to trailing guide 532; the trailing guide 532 is cooperatively secured to the energy converter 542. The energy converter 542 is securely mounted onto the pivoting carrier 538.

Operation-Embodiment of Oscillating Foil with Reciprocating Trailing Draft Member on Vertical pivoting carrier—FIG. 5

This embodiment operates as previously described for FIG. 2-2A above with the advantage of the streamlined vertical frame and alignment with fluid flow provided by the pivoting carrier 538. The combination of the pivot member 528, the pivoting carrier 538 and the variable foil 520 allows this embodiment to act like a self-orientating vane. Alignment with fluid flow maximizes efficiency of energy harvest.

Embodiment of Oscillating Foil with Trailing Draft Member Integral with the Pivoting Carrier—FIG. 6

The variable foil 620 is secured to leading draft member 650 of the leading support 622; leading draft member 650 is securely coupled to the energy converter 642, the latter being secured to the ground directly or via the anchor 626. Trailing draft member 630 is secured to the pivoting carrier 638. The variable foil 620 is secured at the leading edge to leading draft member 650 of the leading support 622 and at the trailing edge to trailing draft member 630, with an extension or tail 620x past the trailing draft member 630. The trailing draft member 630 may advantageously be pivotably secured to the pivoting carrier 638 by way of a bearing (not shown). This embodiment can also be built with the trailing draft member 630 rigidly fixed to the pivoting carrier 638; in that case the tail 620x can be omitted. The length of the variable foil 620 is set greater than the shortest distance between the leading draft member 650 and the trailing draft member 630: the greater the length, the greater the camber.

Operation-Embodiment of Oscillating Foil with Trailing Draft Member Integral with the Pivoting carrier—FIG. 6

Figure 7:
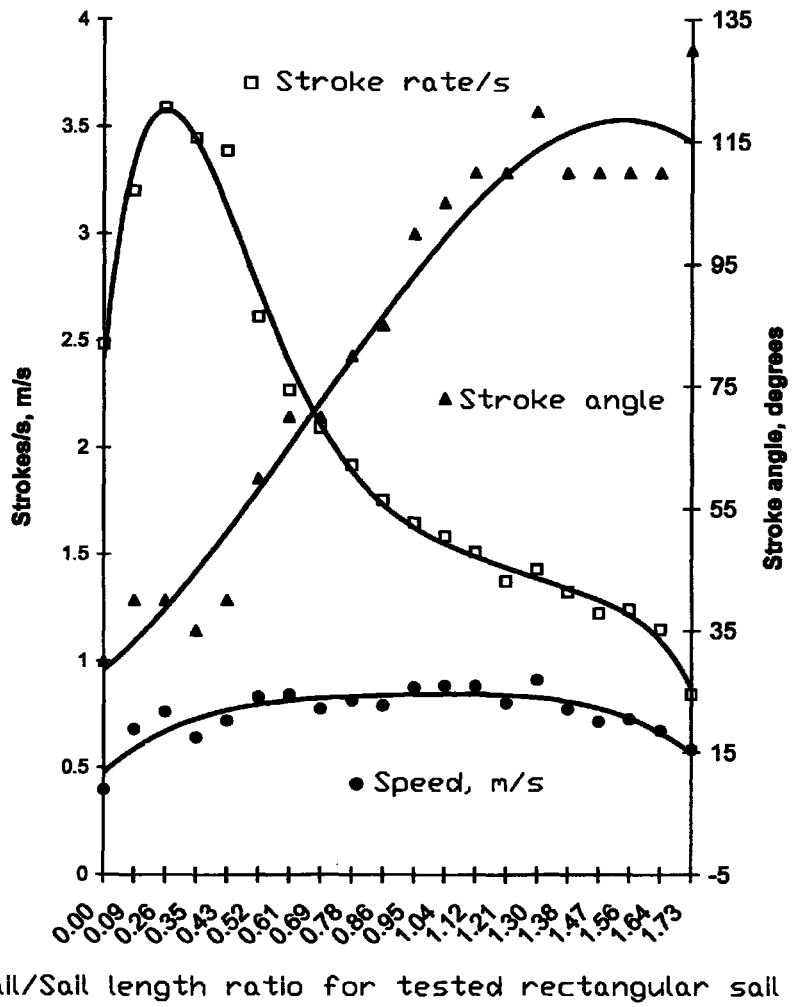
FIG. 7 is a chart view of an example of the influence of the tail on the oscillation of the variable foil machine embodied in FIG. 6.

FIG. 6 shows the Variable Foil Machine at position y, midway trough an anticlockwise swing along arc zyx, powered by fluid flow along the direction shown by arrows from leading support 622 and through position y of arc zyx. The variable foil 620 is cambered to the left by the force of fluid flow; from starting position z the trailing draft member 630 swivels the energy converter 642 towards position y, ending the swing at position x. From position x, due to a favorable angle of attack, the force of fluid flow reverses the camber of the variable foil 620 to initiate the reverse swing. An example of the configuration of the variable foil 620 for the reverse, clockwise swing is shown in discontinuous lines; camber is reversed at the end of each swing thus sustaining the oscillations. Operation of the energy converter 642 produces energy or work from the energy of fluid flow. A rotary generator or a linear generator may also be cooperatively coupled to the trailing draft member 630 or to the pivoting carrier 638 (not shown). Any other useful device or machine may be driven in a similar manner to produce energy or perform work or function. The combination of the energy converter 642 with the variable foil 620 allows this embodiment to act like a self-orientating vane. Alignment with fluid flow maximizes efficiency of energy harvest. Reciprocating movement to rotary movement adapter mechanisms may be utilized to drive rotary machines using the present embodiment. This embodiment offers the advantage of flow alignment and simplicity. Preliminary trials have indicated the influence of the tail 620x on oscillation parameters for a rectangular sail, as shown in FIG. 7. Thus use of the tail 620x may depend on the characteristics of the sail used and the intended application: for example, ship based installations would perform best at maximum lift to drag ratio, normally associated with a small angle of attack and Bermuda or junk sail types. A small angle of attack translates to a Variable Foil Machine with a small stroke angle but fast stroke rate. Since drag may not be as performance limiting for land based installations, maximum stroke angle with lower stroke frequency may provide smoother, quieter operation and maximum speed.

Figure 8:
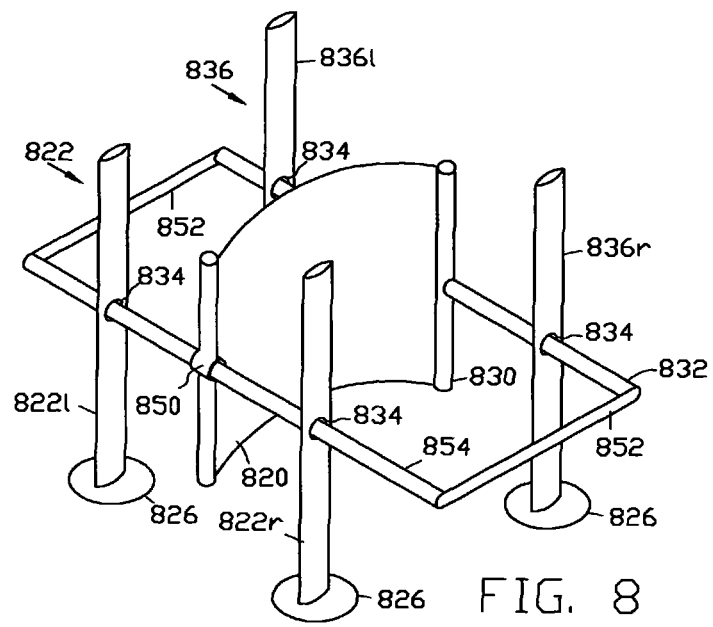
FIG. 8 is a perspective view of a translating variable foil with linked draft members.

Embodiment of Translating Foil with Linked Draft Members—FIG. 8

In FIG. 8 there is provided leading draft member 850, having a displacement amplitude, for motion transfer, securely but slidably connected to leading guide 854, for motion control. The leading draft member 850 may be advantageously indexed to the leading guide 854 by way of fluting, splines, keys, a square fit or any other means that control rotation. The trailing draft member 830, for motion transfer, is securely connected to the trailing guide 832. The leading draft member 850 and the trailing draft member 830 are securely connected to the leading edge and to the trailing edge of the variable foil 820, respectively. The leading guide 854 is secured to the trailing guide 832 via a guide link 852, for guide consolidation. The leading guide 854 is securely and slidably supported through aperture 834 located on fore right support member 822r and fore left support member 822l of the leading support 822. The trailing guide 832 is securely and slidably supported through aperture 834 located on aft left support member 836l and aft right support member 836r of the trailing support 836. Support members 822l, 822r, 836l and 836r may be driven directly into the ground or secured to the ground or reference ground via the anchor 826. The span of the leading support 822, between fore left support member 822l and fore right support member 822r is less than the span of the trailing support 836, between aft left support member 836l and aft right support member 836r; this span difference sets the displacement or reciprocation amplitude of the leading draft member 850 less than the displacement or reciprocation amplitude of the trailing draft member 830. This embodiment of the Variable Foil Machine provides the advantage of a consistent angle of attack and camber for maximum power output per translation stroke. Energy converters (not shown) may be driven by the present embodiment of the Variable Foil Machine by coupling to any of the trailing draft member 830, the leading draft member 850 or mechanical linkage thereto. Linear generators, reciprocating devices and other machines may be actuated by the present embodiment. Reciprocating movement to rotary movement adapter mechanisms may be utilized to drive rotary machines using the present embodiment of the Variable Foil Machine. As previously described for FIG. 3-3A the functions of the trailing guide 832 and the trailing support 836 may also be provided by an energy converter (not shown), coupled to the trailing draft member 830; the leading support 822 and leading guide 854 may also be provided in a similar manner (not shown); this simplifies construction, reduces weight and size by reducing the number of components; in such a substitution, in order to maintain the displacement amplitude offset, the trailing draft member's crank arm can be made longer than the leading draft member's crank arm.

Operation-Embodiment of Translating Foil with Linked Draft Members—FIG. 8A-8D

Figure 8A:
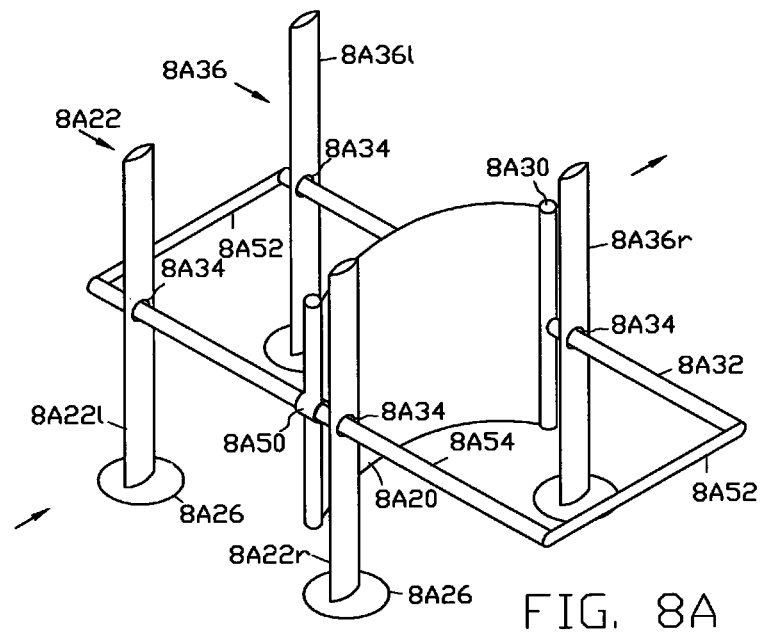
FIG. 8A is a perspective view of a translating variable foil with linked draft members, at the start of a leftward stroke.
Figure 8B:
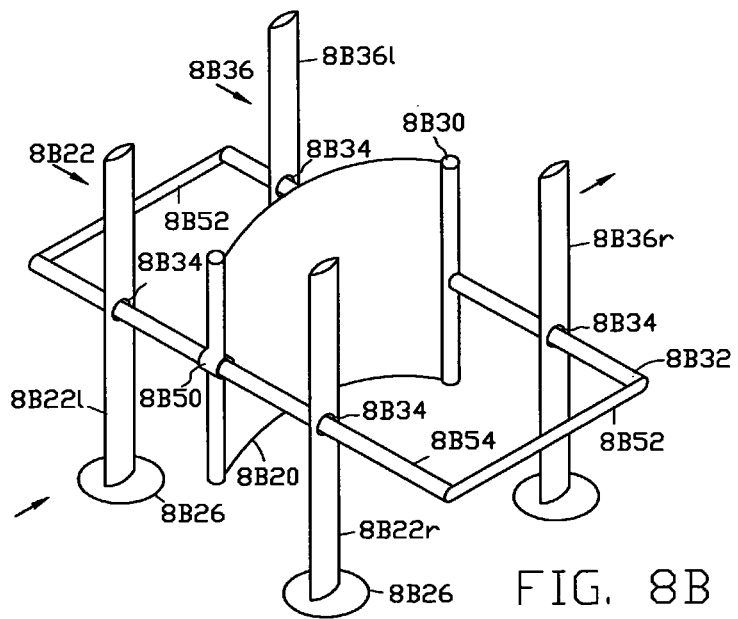
FIG. 8B is a perspective view of a translating variable foil with linked draft members, midway through a leftward stroke.
Figure 8C:
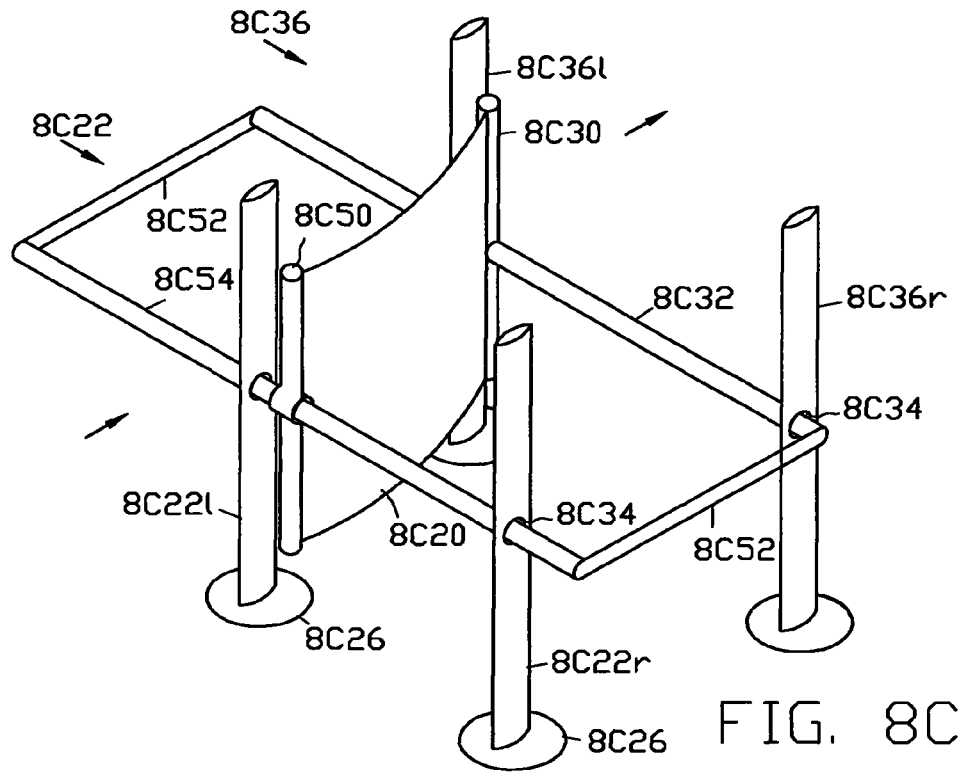
FIG. 8C is a perspective view of a translating variable foil with linked draft members, at the end of a leftward stroke.
Figure 8D:
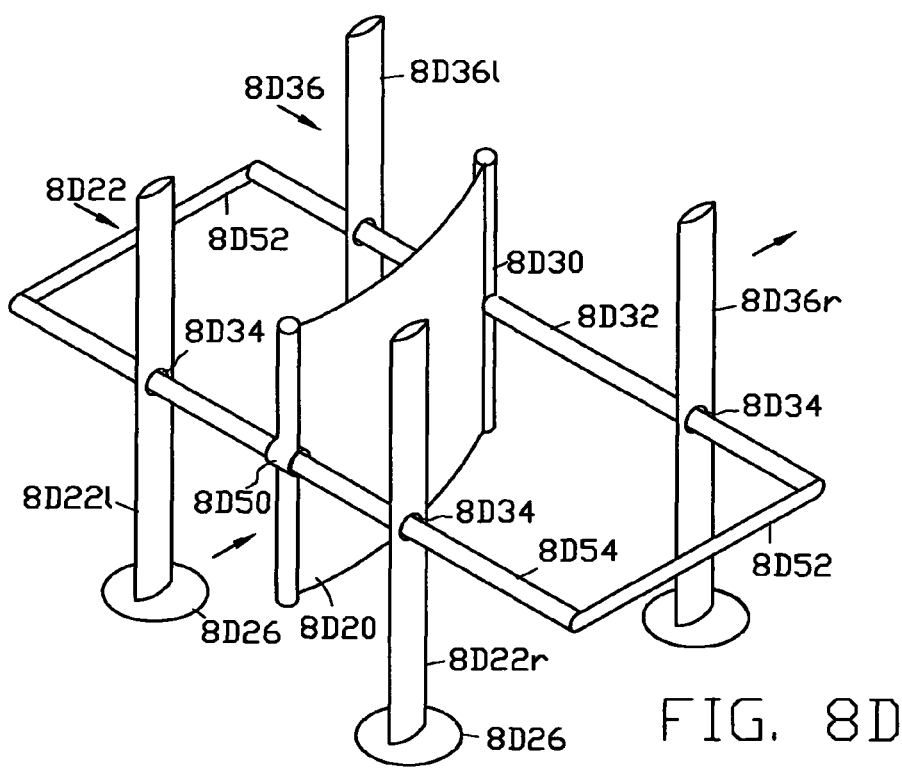
FIG. 8D is a perspective view of a translating variable foil with linked draft members, midway through a rightward stroke.

The sequence of operation proceeds from FIG. 8A to FIG. 8D and back to FIG. 8A. In FIG. 8A the variable foil 8A20 is carried by a shuttle made out of the interconnected leading guide 8A54 and trailing guide 8A32. This shuttle translates cyclically as a unit and reverses itself likewise to sustain motion, so long as flow of fluid is maintained through the machine. FIG. 8A shows the present embodiment at the start of a leftward translation cycle with the leading draft member 8A50 against or very close to the fore right support member 8A22r and the trailing draft member 8A30 very close or against aft right support member 8A36r. The span of the leading support 8A22, between fore left support member 8A22l and fore right support member 8A22r is less than the span of the trailing support 8A36, between aft left support member 8A36l and aft right support member 8A36r; this difference in span is accommodated by the ability of the leading draft member 8A50 to slide over the leading guide 8A54, setting thus the angle of attack of the variable foil 8A20 in relation to the direction of fluid flow. Fluid flow through the machine forces the variable foil 8A20 to bow to the left, forming a fluid-dynamic foil; the variable foil 8A20 is forced to move leftward, together with the leading draft member 8A50, the trailing draft member 8A30, the leading guide 8A54 and the trailing guide 8A32, as a unit secured by the guide link 8A52, for guide consolidation. FIG. 8B shows the embodiment midway through the leftward translation. FIG. 8C shows the embodiment at the end of the leftward translation: the leading draft member 8C50 is stopped by fore left support member 8C22l; the leading guide 8C54, united with the trailing guide 8C32 by way of the guide link 8C52, continues to move through the leading draft member 8C50 and through aperture 8C34 until the trailing draft member 8C30 comes very close or against aft left support member 8C36l, thus setting the angle of attack of the variable foil 8C20 for the reverse translation. Continued fluid flow through the machine forces the variable foil 8C20 to bow to the right, forming a fluid-dynamic foil; the variable foil 8C20 is forced to move rightward, together with the leading draft member 8C50, the trailing draft member 8C30, the leading guide 8C54 and the trailing guide 8C32, as a unit secured by the guide link 8C52. FIG. 8D shows the embodiment midway through the rightward translation, on the way back to the starting configuration shown in FIG. 8A. In FIG. 8A the leading draft member 8A50 is stopped by fore right support member 8A22r; the leading guide 8A54, united with the trailing guide 8A32 by way of the guide link 8A52, continues to move through the leading draft member 8A50 and through aperture 8A34 until the trailing draft member 8A30 comes very close or against aft right support member 8A36r, thus setting the angle of attack of the variable foil 8A20 for the next cycle of translation, to and fro.

Figure 9:
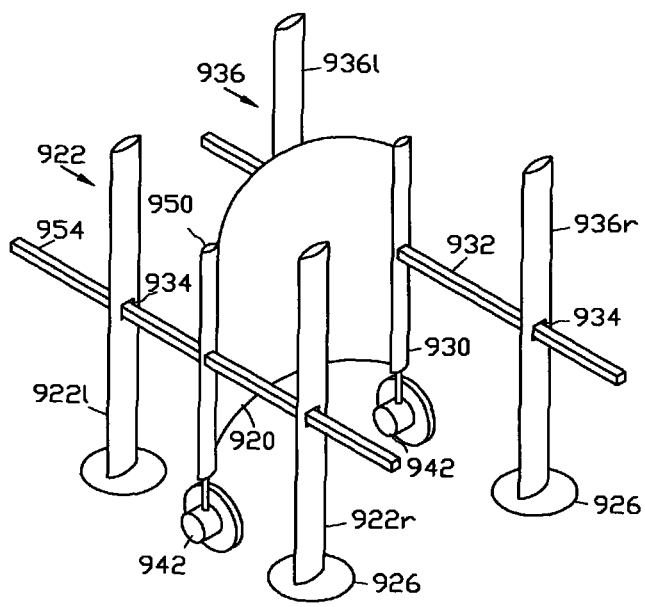
FIG. 9 is a perspective view of a translating variable foil with independent draft members.

Embodiment of Translating Foil with Independent Draft Members—FIG. 9

In FIG. 9 there is provided the leading draft member 950, for motion transfer, securely connected to the leading guide 954. The trailing draft member 930, for motion transfer, is securely connected to the trailing guide 932. The leading draft member 950 and the trailing draft member 930 are securely connected to the leading edge and to the trailing edge of the variable foil 920, respectively. The leading guide 954 is securely and slidably supported through aperture 934 located on fore left support member 922l and fore right support member 922r of the leading support 922. The trailing guide 932 is securely and slidably supported through aperture 934 located on aft left support member 936l and aft right support member 936r of the trailing support 936. The leading guide 954 and the trailing guide 932 may be advantageously indexed to aperture 934 with fluting, splines, keys, a square fit or any other means that control rotation about the aperture 934. Additional guides may also be provided for sound load support and guidance, depending on scale of installation. Support members 936l, 936r, 922l and 922r may be driven directly into the ground or secured to the ground or reference ground via anchor 926. The span of the leading support 922, between fore left support member 922l and fore right support member 922r is less than the span of the trailing support 936, between aft left support member 936l and aft right support member 936r; this span difference sets the displacement amplitude of the leading draft member 950 less than that of the trailing draft member 930. The energy converter 942, in the form of a rolling generator for example, may be coupled to either of the leading draft member 950 and the trailing draft member 930. Alternative power take off from either of the leading guide 954 and the trailing guide 932 is another advantage of this embodiment. As previously described for FIG. 3-3A, the functions of the trailing guide 932 and the trailing support 936 may also be provided by an energy converter (not shown), coupled to the trailing draft member 930; in a similar way, the leading support 922 and leading guide 954 may also be provided by an energy converter; this simplifies construction, reduces weight and size by reducing the number of components. In such a substitution, in order to maintain the displacement amplitude offset, the trailing draft member's crank arm can be made longer than the leading draft member's crank arm.

Operation-Embodiment of Translating Foil with Independent Draft Members—FIG. 9

This embodiment operates as previously described, for FIG. 8 in FIG. 8A-8D above, with the advantage of independence between the leading draft member 950 and the trailing draft member 930. Although the leading draft member 950 is fixed on the leading guide 954, independence of movement from the trailing guide 932 provides for stopping of the leading draft member 950 against fore left support member 922*l* and fore right support member 922*r*; the trailing draft member 930 travels further to set the angle of attack for translation. Translation of the trailing draft member 930 and the leading draft member 950 drives the energy converter 942 against the reference ground or terrain to produce energy (e.g. electricity). Linear generators, reciprocating devices and machines may be actuated by the present embodiment. Reciprocating movement to rotary movement adapter mechanisms may be utilized to drive rotary machines using the present embodiment of the Variable Foil Machine.

Additional Embodiments, Uses and Operation

The embodiments presented above and features thereof can be combined differently to create variations of the Variable Foil Machine without departing from the spirit of the invention. For example, units of the Variable Foil Machine may be arranged in tandem to share common guides; a cascade layout may also be adopted by staggering placement of units to extract residual energy in the wake of fluid flow. Draft members, with magnets attached, may be placed to oscillate between stator coils to produce energy (e.g. electricity). Possible spin off uses of the Variable Foil Machine include wind and water control or redirection, snow drift control, flags, advertising or communication billboards, art canvas and esthetic shields, screens or fences.

Figure 10:
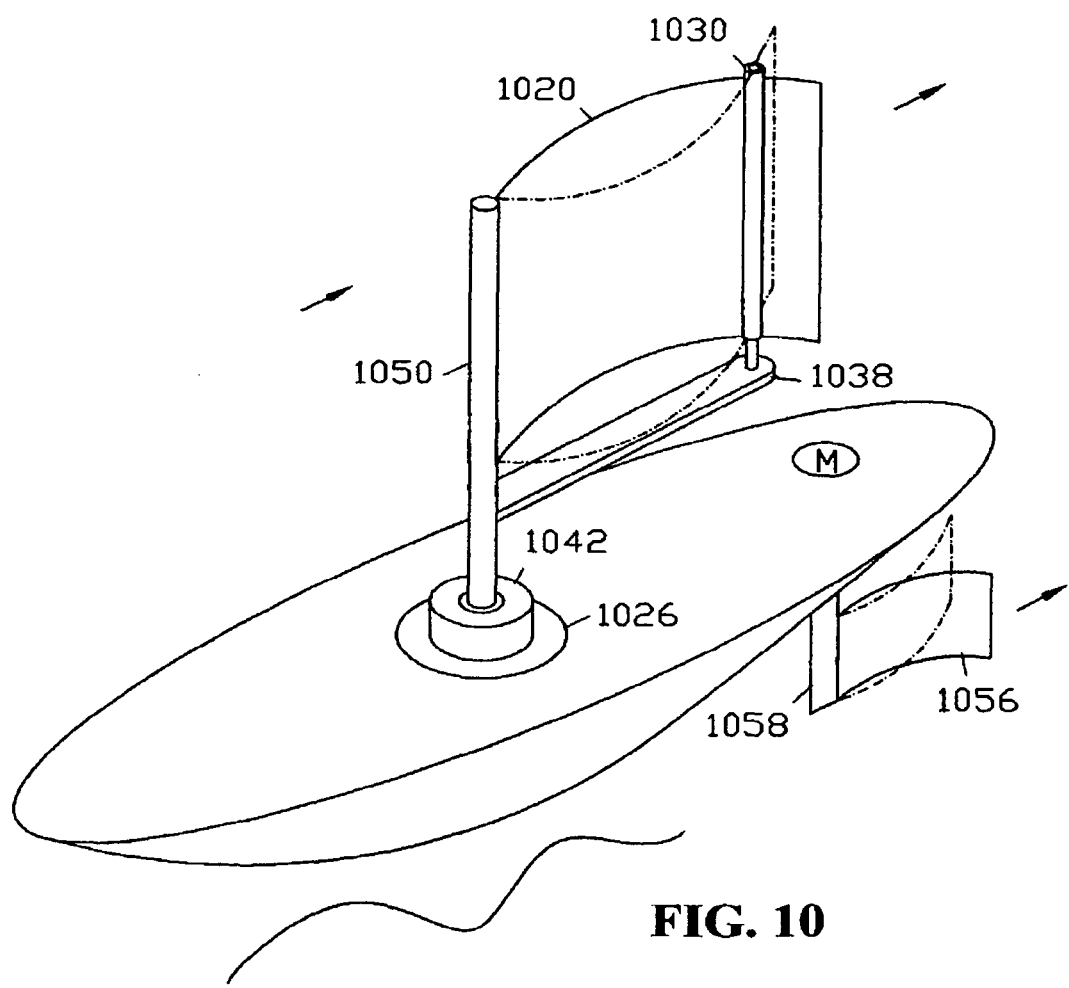
FIG. 10 is a perspective view of an example of propulsion of a watercraft by a vertical wind powered variable foil machine actuating a fin.
Figure 11:
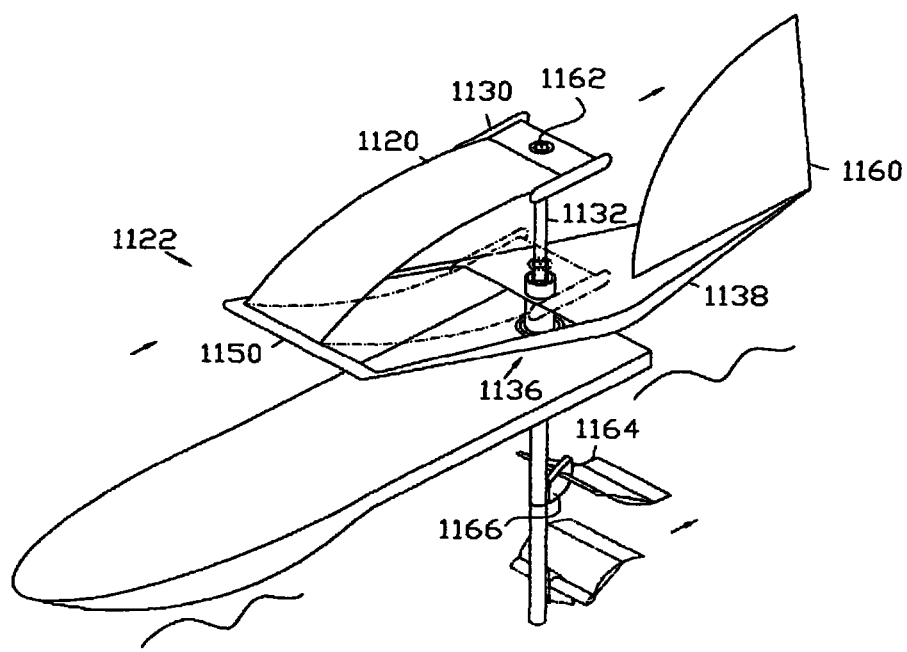
FIG. 11 is a perspective view of an example of propulsion of a watercraft by a horizontal wind powered variable foil machine actuating a propulsive variable foil machine.

Craft Propulsion—FIG. 10-11

In FIG. 10 there is exemplified a watercraft fitted with a Variable Foil Machine capable of self-orientation into the wind. The variable foil 1020 is secured at the leading edge to leading draft member 1050. Leading draft member 1050 is cooperatively secured to the energy converter 1042 in turn secured to the deck of the watercraft via the anchor 1026. The variable foil 1020 is pivotably secured at the trailing edge to the trailing draft member 1030 beyond which it extends. The trailing draft member 1030 is in turn securely attached to the pivoting carrier 1038. The power generated by the energy converter 1042 under effective fluid flow, or wind, is fed to motor M; motor M operates a propulsion fin 1056, for thrust, through a fin carrier member 1058. Oscillations of the propulsion fin 1056 propel water along direction shown by bottom arrow, moving the craft in the opposite direction. Illustrative configurations of oscillations of the variable foil 1020 and the propulsion fin 1056 are shown in discontinuous lines.

In FIG. 11 there is exemplified a watercraft fitted with two linked Variable Foil Machines, the first for harnessing wind energy and the second for converting the harvested energy into water propulsion work. The variable foil 1120 is secured at the leading support 1122, to leading draft member 1150 which in turn is securely mounted on the pivoting carrier 1138. The pivoting carrier 1138 is rotatable about the trailing support 1136 and may be fitted with a steering control member or rudder 1160, for alignment with flow. Alternatively other orientating methods may be used, for example manual orientation or electric sensor-based controls and actuators. The trailing support 1136 is secured to the craft. The trailing draft member 1130 is securely and rotatably attached to the trailing guide 1132 by way of a rotatable bearing device 1162, for movement support; the trailing guide 1132 is free to shuttle up and down through the trailing support 1136, extending below the ship into water. In the water, a propulsive variable foil 1164, for thrust, based on the previously disclosed embodiment of FIG. 6, may be advantageously attached to the trailing guide 1132 using an angler 1166, for controlling angle of attack. The angler 1166 is swively-secured to the trailing guide 1132 to maintain an effective hydrodynamic angle of attack for the propulsive variable foil 1164 during the cyclic shuttling through water.

In the upward stroke, the propulsive variable foil 1164 is forced by water pressure into the effective hydrodynamic angle to propel water along direction shown by bottom arrow. In the downward stroke, shown in discontinuous lines, water pressure forces the propulsive variable foil 1164 to swivel into the reverse angle of attack, thus generating further propulsion along direction of bottom arrow. The substantially horizontal orientation of the Variable Foil Machine is anticipated to provide a stability advantage to the craft, the force of the wind being directed upward and downward cyclically.

The embodiments shown in FIG. 8-9 can also be adapted along the lines of the above concept. The cyclic translations of these embodiments could directly propel the craft via the propulsive fin 1056 (FIG. 10) or the propulsive variable foil 1164 (FIG. 11) as described above. Other embodiments of the Variable Foil Machine may be adapted for craft propulsion.

The substantially horizontal orientation of the present embodiment discloses a novel horizontal sail. Improved lift efficiency through Wing In Ground effect is an advantage anticipated from this embodiment.

6. INDUSTRIAL APPLICABILITY

The Variable Foil Machine is generally applicable to industrial processes, machines and devices that use or require motive power, barring convenience and practicality of individual application circumstances. Some specific applications are identified below.

Source of Electricity from Wind-Powered Generators

The Variable Foil Machine is well suited to harnessing of wind power. The energy harnessed can be converted to electricity by driving electric generators. The absence of a rigid propeller airfoil makes the machine well suited for reduced profile applications such as residential installations and telecommunication tower applications. Other possible areas of use include portable generators, on-farm generators, emergency relief generators and provision of power in remote locations.

Source of Electricity from Water-Powered Generators

The Variable Foil Machine may also harness hydro power from water dams, streams, rivers, water falls, water currents and tidal flow. Portable water-powered generators is another possible application, for areas with flowing water bodies. Other applications include on-farm generators, emergency relief generators and provision of power in remote locations.

Source of Electricity from Thermal Power Generators

The Variable Foil Machine may also harness the energy of the working medium in thermal power plants as an alternative to the conventional turbine as the energy harness mechanism.

Fluid Pumping

The Variable Foil Machine may operate pumps to pump fluids like water or petroleum oil from wells, drainage basins or polders. Hydraulic pumps may also be operated in a similar way to produce transmissible hydraulic power.

Mills

The Variable Foil Machine may operate mills used for mining, food processing and manufacturing machines.

Flow Sensors

The Variable Foil Machine may be adapted to perform as a fluid flow sensor by measuring the electrical output of an operationally-coupled generator.

Fluid Propulsion and Craft Propulsion

The Variable Foil Machine may be used as a fluid propeller. Craft propulsion is thus another application, as exemplified under Additional embodiments, uses and operation. Ground-based leisure and sport vehicles (e.g. beach buggies) may also be fitted with the Variable Foil Machine as motive power source in areas with suitable wind energy opportunities. Other crafts may be powered using the present invention.

Appropriate Technology

The Variable Foil Machine offers a simplified design that may enable easy adoption in developing countries and in other resource-challenged circumstances.

Possible Spin Off Uses

Possible spin off uses include wind and water control or redirection, snow drift control, flags, advertising or communication billboards, art canvas and esthetic shields, screens or fences. Since other modifications and changes varied to fit particular operating requirements and environments will be apparent to those skilled in the art, the invention is not considered limited to the examples chosen for purposes of disclosure, and covers all changes and modifications which do not constitute departures.

Having thus described the invention, what is desired to be protected is presented in the subsequently appended claims.

7. LIST OF REFERENCE SIGNS

20 variable foil
20x tail
22 leading support
22*l* fore left support member
22*r* fore right support member
26 anchor
28 pivot member
30 trailing draft member
32 trailing guide
34 aperture
36 trailing support
36*c* aft center support member
36*l* aft left support member
36*r* aft right support member
38 pivoting carrier
40 wheel
42 energy converter
44 carriage
48 crank arm
50 leading draft member
52 guide link
54 leading guide
56 propulsion fin
58 fin carrier member
60 rudder
62 bearing member
64 propulsive variable foil
66 angler The embodiments of the invention in which an exclusive property or privilege is claimed are defined as follows:

1. A variable foil machine for harnessing energy from fluid flow and propelling fluids and crafts, comprising:
   a variable wing, having a leading edge and a trailing edge, for energy capture;
   a leading support;
   a trailing support;
   a trailing guide, moveably connected to the trailing support;
   a trailing draft member, securely connected to and along the trailing edge of the variable wing and securely connected to the trailing guide; and
   a leading draft member, securely connected to and along the leading edge of the variable wing and securely connected to the leading support whereby, upon effective fluid flow from the leading edge to the trailing edge, the variable wing oscillates with a cyclic camber reversal at the end of each stroke thereby causing a reciprocating movement of the trailing draft member, and the trailing guide, together as a unit.

2. A variable foil machine for harnessing energy from fluid flow and propelling fluids and crafts, comprising:
   a variable wing, having a leading edge and a trailing edge, for energy capture;
   a leading support;
   a leading guide, moveably connected to the leading support;
   a leading draft member, securely connected to and along the leading edge of the variable wing and securely connected to the leading guide;
   a trailing support;
   a trailing guide, moveably connected to the trailing support; and
   a trailing draft member, securely connected to and along the trailing edge of the variable wing and securely connected to the trailing guide whereby, upon effective fluid flow from the leading edge to the trailing edge, a reciprocation amplitude offset between the leading draft member and the trailing draft member causes cyclic translation of the variable wing, the leading draft member, the leading guide, the trailing draft member, and the trailing guide, together as a unit, through a cyclic camber reversal at the end of each stroke.

3. A variable foil machine for harnessing energy from fluid flow and propelling fluids and crafts, comprising:
   a variable wing, having a leading edge and a trailing edge, for energy capture;
   a leading support,
   a leading guide, moveably connected to the leading support;
   a leading draft member, securely connected to and along the leading edge of the variable wing and securely connected to the leading guide;
   a trailing support, securely connected to the leading draft member; and
   a trailing draft member, securely connected to and along the trailing edge of the variable wing and securely connected to the trailing support whereby, upon effective fluid flow from the leading edge to the trailing edge, the variable wing oscillates with a cyclic camber reversal at the end of each stroke thereby causing an arcuate reciprocating movement of the trailing draft member and the leading draft member, together as a unit.

4. The machine of claim 3 further including a tail extending from the variable wing, pivotably secured to the trailing draft member.

5. The machine of claim 1 or 2 further including a tail extending from the variable wing, pivotably secured to the trailing draft member.

6. The machine in accordance with any one of claim 1, 2 or 5 wherein the trailing guide is moveably connected to the trailing support by a crank arm, the crank arm being securely connected to the trailing draft member and wherein the length of the variable wing equals or exceeds the sum of the length of the crank arm and the distance from the leading draft member to the center of the crank arm, whereby integration of oscillations into rotational movement is effected.

7. The machine of any one of claim 1, 2, 5 or 6 wherein the trailing support and the trailing guide are provided for by an energy converter, cooperatively connected to the trailing draft member.

8. The machine of any one of claim 1, 2, 5, 6 or 7 wherein the leading support and the leading guide are provided for by an energy converter, cooperatively connected to the leading draft member.

9. The variable foil machine as recited in any one of claims 1, 2, and 5 to 8 further comprising:
    a pivoting carrier, securely connected to the leading support, securely connected to the trailing support and moveably secured to a base, whereby alignment with fluid flow is effected.

10. The machine of any one of claims 1 to 9 further including an energy converter, cooperatively connected to the trailing draft member or linkage thereto whereby movement of the trailing draft member drives the energy converter to perform work or produce energy.

11. The machine of any one of claims 1 to 9 further including an energy converter, cooperatively connected to the leading draft member or linkage thereto whereby movement of the leading draft member drives the energy converter to perform work or produce energy.

12. The machine of claim 10 further including an energy converter, cooperatively connected to the leading draft member or linkage thereto whereby movement of the leading draft member drives the energy converter to perform work or produce energy.

13. The machine of any one of claims 1 to 12 wherein the variable wing is orientated substantially parallel to the ground or base, thereby providing a horizontal sail.

14. The variable foil machine of any one of claims 1 to 13 wherein symbols, signage, advertisements are displayed thereby enabling communication.

15. A method of propelling fluids and crafts comprising the steps of:
    securing the variable foil machine of any one of claims 1 to 14 to a base; and
    reciprocating the variable foil machine at an effective fluid-dynamic angle whereby fluids are propelled from the trailing edge of the variable wing thereby forcing the variable foil machine and the base in the opposite direction.

* * * * *